Patented July 1, 1941

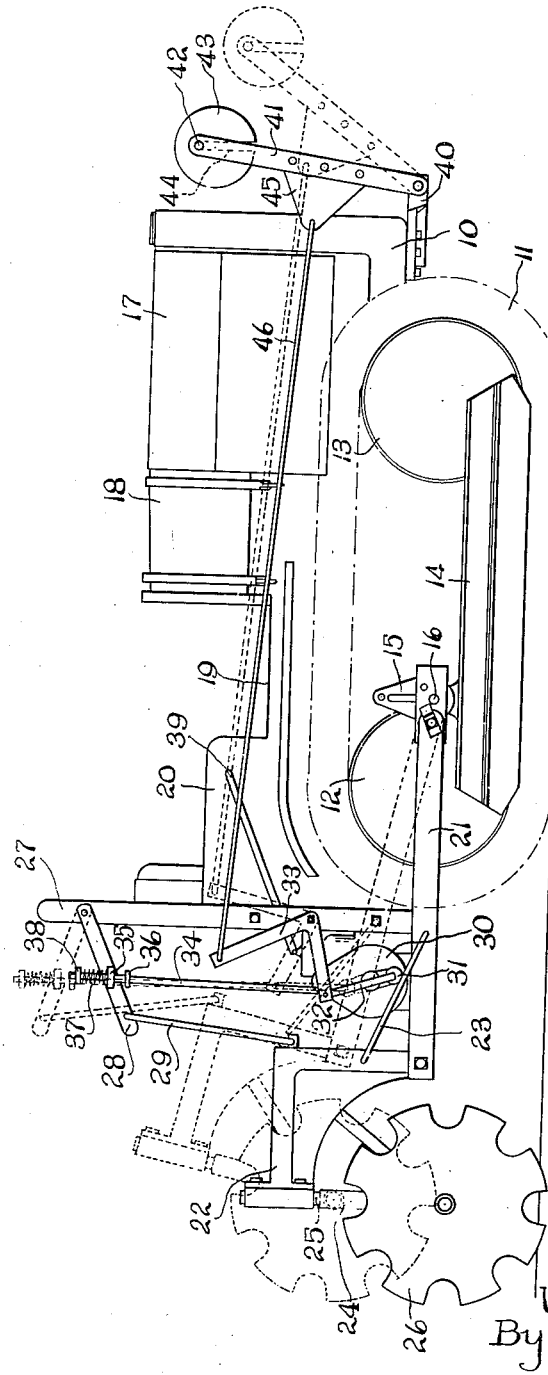

2,247,680

UNITED STATES PATENT OFFICE 2,247,680

AGRICULTURAL IMPLEMENT

William S. Graham, Canton, Ill., assignor to International Harvester Company, a corporation of New Jersey Application April 19, 1938, Serial No. 202,922

2 Claims. (Cl. 97—47)

This invention relates to an agricultural implement of the tractor connected type, and more particularly to a tractor connected implement in which means are provided for counterbalancing and lifting the weight of the implement.

In ordinary tractor-attached implements, wherein the implement is carried by or connected to a rearward portion of the tractor and wherein the implement is of a heavy type, considerable difficulty is experienced in preventing the forward portion of the tractor from being raised by the weight of the implement at the rear. Such heavy implements are of the types including cane or other stalk choppers, in which the implement is of necessity of considerable size and weight. While the implement is in ground-engaging position, very little of its weight, if any, is directly supported by the tractor, the only weight or force transmitting connection between the implement and the tractor being that connection utilized as a draft connection. However, when it becomes necessary to raise the implement, the weight of the implement is then supported entirely by the tractor through the connections provided between the implement and lifting and lowering mechanism carried by the tractor, and this condition, combined with the position of the implement and the lifting and lowering mechanism at the rear of the tractor, results in lifting the forward end of the tractor upwardly from the ground about the axis of the rear wheels of the tractor. The same conditions will result when the tractor and implement are operating over uneven terrain and the implement, following the contour of the ground, enters a deep or low portion therein. Numerous efforts have been made to provide means for counteracting the adverse reactions of the implement with respect to the tractor; however, none of these means has been adapted to counterbalance the weight of the implement in accordance with its vertical position, nor to assist in raising the implement from the ground.

The principal object of the invention then is to provide in a tractor-connected implement an improved means for counterbalancing the weight of the implement.

An important object is to provide this counterbalancing means in a manner whereby it operates to assist in raising the implement.

Another important object is to provide this counterbalancing means in the form of a weight, which may be shifted with respect to the tractor according to the vertical position of the implement with respect to the tractor.

Another object is to provide means for maintaining the weight in a certain position according to the position of the implement.

Another object of the invention is to provide lifting and lowering mechanism for lifting and lowering the implement, and to connect this mechanism with the aforesaid means for releasing the same upon lifting of the implement.

Still another object is to interconnect the weight and the lifting and lowering mechanism in a manner providing for movement of the weight in a direction that will assist in raising the implement.

Briefly, these and other desirable objects of the invention may be achieved in one preferred embodiment of the invention wherein an implement is connected at the rear of the tractor. A counterbalancing weight is carried at a forward portion of the tractor for movement at least forwardly with respect thereto, normally assuming a static position on the tractor. The implement is connected to lifting and lowering mechanism, which, in turn, is connected to the weight in such a manner that the weight is shifted forwardly as the implement is raised, the interconnections being such that forward movement of the weight assists the lifting and lowering mechanism in lifting the implement.

A more complete understanding of the objects and features of the invention may be had from the following description taken in conjunction with the accompanying sheet of drawing, wherein:

The one figure shows a side elevational view of a tractor-connected implement provided with the improved counterbalancing and lifting means.

The tractor chosen for the purposes of illustrating the invention is of the track-laying type and comprises a main body portion 10, which is, in the usual manner, carried on a pair of oppositely disposed self-laying tracks 11. Each self-laying track comprises a track structure including a drive sprocket wheel 12, a front idler wheel 13 about which the track is trained, and a track frame structure 14. The drive sprocket 12 is driven in the usual manner from the driving mechanism of the tractor. This construction is well known to those skilled in the art and has, therefore, been illustrated in diagrammatic fashion. The track frame structure 14 is movably carried on a bracket structure 15 rigidly carried by the tractor body 10. The track frame 14 is mounted on this bracket for pivotal movement about a transverse horizontal axis, as at 16. The tractor is further provided with the usual engine hood 17, fuel tank 18, and operator's deck 19, which includes an operator's station or seat 20.

The bracket structure 15 also carries for vertical movement about the transverse axis 16 a rearwardly extending draft beam 21. This beam 21 extends longitudinally rearwardly substantially parallel to the ground and has secured to a rearward portion thereof an upstanding supporting element or casting 22, which is held against movement with respect to the beam 21 by a brace member 23. A rearward portion of the casting 22 has secured thereto a bearing 24, in which is journaled the standard or axle 25 of a ground-engaging element. In the present disclosure the implement is shown to be of the type utilized in chopping cane and the like, and comprises a plurality of notched disks 26, only one of which is illustrated. The operation of this type of implement is well understood by those skilled in the art.

The lifting and lowering mechanism for moving the implement to and from the ground will now be described, the mechanism in the present disclosure being of the power lift type. A pair of vertically extending support members 27, only one of which is illustrated, is rigidly carried at the rear portion of the tractor body 10. A rearwardly extending lift arm 28 is pivotally carried by an upper portion of each member 27 and has its rearward portion pivotally connected by a lift link 29. The lower end of the lift link 29 is pivotally connected to the support or casting 22. In order to provide for raising the lift arm 28 upwardly to raise the implement from the ground, a power lift mechanism 30 has been provided. This mechanism may be of any well known type and is driven by the driving mechanism of the tractor in any suitable manner. The lift mechanism shown is of the half-revolution type including a crank arm 31 carried on a transverse rock-shaft. A link 32 is pivotally connected at one end to the outer end of the crank 31 and at the other end, to one arm of a bell crank 33 pivotally carried on a horizontal axis on the support 27.

A vertically extending lift rod 34 is pivotally connected to said arm of the bell crank 33 at substantially the point of connection between the arm and the link 32. This rod 34 extends upwardly adjacent the lift arm 28, the arm 28 being provided with an outwardly extending block portion 35, through which the upper end of the rod 34 passes. The rod is provided with a collar 36 adapted to be rigidly secured to the rod at various positions thereon. This collar 36 abuts the block 35 on the arm 28. The portion of the rod 34 which extends above the block 35 is provided with a compression spring 37, which may be adjusted by an adjusting nut 38. The purpose of this means of connection between the rod 34 and the arm 28 is to apply downward pressure to the implement, all of which is more or less conventional. Thus far, it will be seen that rotation of the crank arm 31 through an arc of 180 degrees will operate the lifting mechanism to raise the implement from the ground, as is illustrated in dotted lines in the drawing. A control lever 39 is provided for operating the power lift mechanism and extends closely alongside the operator's station 20 within easy reach of an operator on the tractor.

The following description will pertain to the counterbalancing and lift assisting means. A forward portion of the main body 10 has rigidly secured thereto a forwardly extending support or bracket 40, to which is pivotally connected a pair of upstanding arms 41, only one of which is shown. These arms are of necessity of comparatively sturdy construction and are provided at their upper ends with a transverse support or rod 42. A weight 43 is slotted substantially diametrically, as at 44. This slot provides, among other things, for easily disposing the weight on the rod 42. It will be noted that with the weight in position as supported by the rod 42, a greater mass thereof depends below the rod for purposes to appear later, and the weight assumes a static position on the tractor.

Intermediate its ends, the arm 41 rigidly carries a member 45, to which is pivotally connected one end of a rearwardly extending link 46, the rear end of which is pivotally connected to the other arm of the bell crank 33. Thus, it will be seen that means are provided for interconnecting the weight and the lifting and lowering mechanism, or in effect interconnecting the weight and the implement for related movement.

In the operation of the lifting and lowering mechanism to raise the implement to the dotted line position shown, the counterbalancing means or weight moves from its static position and assumes the position also shown in dotted lines. When the implement is in its down or ground-engaging position, it will be noted that the point of connection between the link 32 and one arm of the bell crank 33, the axis of the power lift rockshaft, and the point of connection between the link 32 and the crank arm 31 lie substantially on the same straight line. These elements of connection provide releasable means in the form of an over-center lock for preventing movement of the weight with respect to the tractor. It is clear, of course, that, when the crank arm 31 rotates, this means is released and the weight 43 is permitted to move forwardly and downwardly with respect to the tractor through an arcuate path described about the point of connection between the arm 41 and the forwardly extending support 40. Thus, it will be seen that, as the implement is raised from the ground, the weight 43 is permitted to shift accordingly, thus counterbalancing the weight of the implement. Also, it will be seen from the dotted position of the parts that the provision of the slot in the weight 43 permits substantially maximum forward movement of the greater mass of the weight with respect to the tractor as the implement is lifted, and thus maximum counterbalancing effect is achieved. Since the weight and the lifting and lowering mechanism are interconnected, forward and downward movement of the weight 43 assists in lifting the implement. Downward movement of the implement toward the ground restores the parts to the full line position shown in the drawing and once more the parts 31, 32 and 33 become interassociated and operate as means to prevent forward movement of the weight with respect to the tractor. This means also prevents rearward movement of the weight and consequently prevents any damage to the forward portion of the tractor.

As previously mentioned, the peculiar construction of tractors of the track-laying type necessitates use of the improved counterbalancing means as provided by the invention. This necessity is brought about by that point of construction in the tractor in which the forward portion of the tractor is supported on a transverse spring carried by the track frame structures 14. This construction, as is well known, permits relative vertical movement between the tractor body and the track frame structures, especially since the track frame structures are carried for vertical movement about the transverse horizontal axis 16. Thus, it will be seen that any undue movement of the implement with respect to the tractor will raise the forward portion of the tractor about said axis.

It will be understood, of course, that the invention is not limited to adaptation to a tractor of the track-laying type, but may be utilized in conjunction with any type of vehicle. It will be further understood that numerous other modifications may be made in construction and operation without departing from the spirit and scope of the invention as defined in the appended claims.

What is claimed is:

1. In combination, a tractor, a ground-engaging implement carried by the tractor for movement about a horizontal axis, an upstanding arm carried at a forward portion of the tractor for movement about a transverse horizontal axis, a weight pivotally carried at the upper end of the arm with a greater mass of the weight depending below the pivot, the weight and arm being thereby movable relative to the tractor, and the weight being movable relative to the arm, and means interconnecting the arm and the implement, movement of the implement from the ground moving the weight and arm forwardly to counterbalance the implement, the aforesaid pivotal connection between the weight and the arm providing for substantially maximum forward movement of the greater mass of the weight with respect to the arm and to the tractor.

2. In combination, a tractor, a ground-engaging implement connected to the tractor for vertical movement, lifting and lowering mechanism for the implement, a movable arm carried by the tractor and connected to the lifting and lowering mechanism, a weight movably carried by the arm and having its greater mass shiftable with respect to the arm as the arm is moved, vertical movement of the implement moving the weight and arm to counterbalance the implement and further shifting the greater mass of the weight with respect to the arm to further counterbalance the implement.

WILLIAM S. GRAHAM.